(12) United States Patent
Zimmer et al.

(10) Patent No.: US 7,350,072 B2
(45) Date of Patent: Mar. 25, 2008

(54) REMOTE MANAGEMENT AND PROVISIONING OF A SYSTEM ACROSS A NETWORK BASED CONNECTION

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 688 days.

(21) Appl. No.: 10/812,019

(22) Filed: Mar. 30, 2004

(65) Prior Publication Data

US 2005/0223007 A1    Oct. 6, 2005

(51) Int. Cl.
*H04L 9/00* (2006.01)
(52) U.S. Cl. ..................................... 713/156
(58) Field of Classification Search ............... 713/156
See application file for complete search history.

(56) References Cited

U.S. PATENT DOCUMENTS

| | | | | |
|---|---|---|---|---|
| 6,681,282 B1* | 1/2004 | Golden et al. | ............... | 710/302 |
| 6,976,163 B1* | 12/2005 | Hind et al. | ................. | 713/156 |
| 6,988,250 B1* | 1/2006 | Proudler et al. | ............... | 716/1 |
| 7,069,452 B1* | 6/2006 | Hind et al. | .................... | 713/1 |
| 7,207,039 B2* | 4/2007 | Komarla et al. | ............ | 717/178 |
| 2004/0243801 A1* | 12/2004 | Chen et al. | ................. | 713/160 |

* cited by examiner

*Primary Examiner*—Nasser Moazzami
*Assistant Examiner*—David Garcia Cervetti
(74) *Attorney, Agent, or Firm*—Venable LLP; James R. Burdett; Caroline J. Swindell

(57) ABSTRACT

An attestation identity key (AIK) is created and stored in a client computer's firmware. When the client computer is connected to a network for the first time, the AIK allows a provisioning server to determine if the client computer has been tampered with. This attestation can take place even in the absence of an operating system on the client computer.

17 Claims, 6 Drawing Sheets

REMOTE MANAGEMENT AND PROVISIONING OF A SYSTEM ACROSS A NETWORK BASED CONNECTION

BACKGROUND OF THE INVENTION

The ability to provision and configure "bare-metal" computers across a network is important to organizations where network security and integrity are important. A "bare-metal" computer is a computer with no operating system installed on it. When a bare-metal computer is obtained from either an original equipment manufacturer (OEM) or another supplier, the purchaser has no way of knowing if the computer has been compromised before connecting it to a network. In particular, pre-boot viruses and defects are currently opaque to provisioning solutions.

Past approaches to this problem have suffered from issues of inefficiency, lack of scalability, inconvenience, and/or licensing.

BRIEF DESCRIPTION OF THE DRAWINGS

The invention shall be described with reference to the accompanying figures, wherein.

Figure 1:
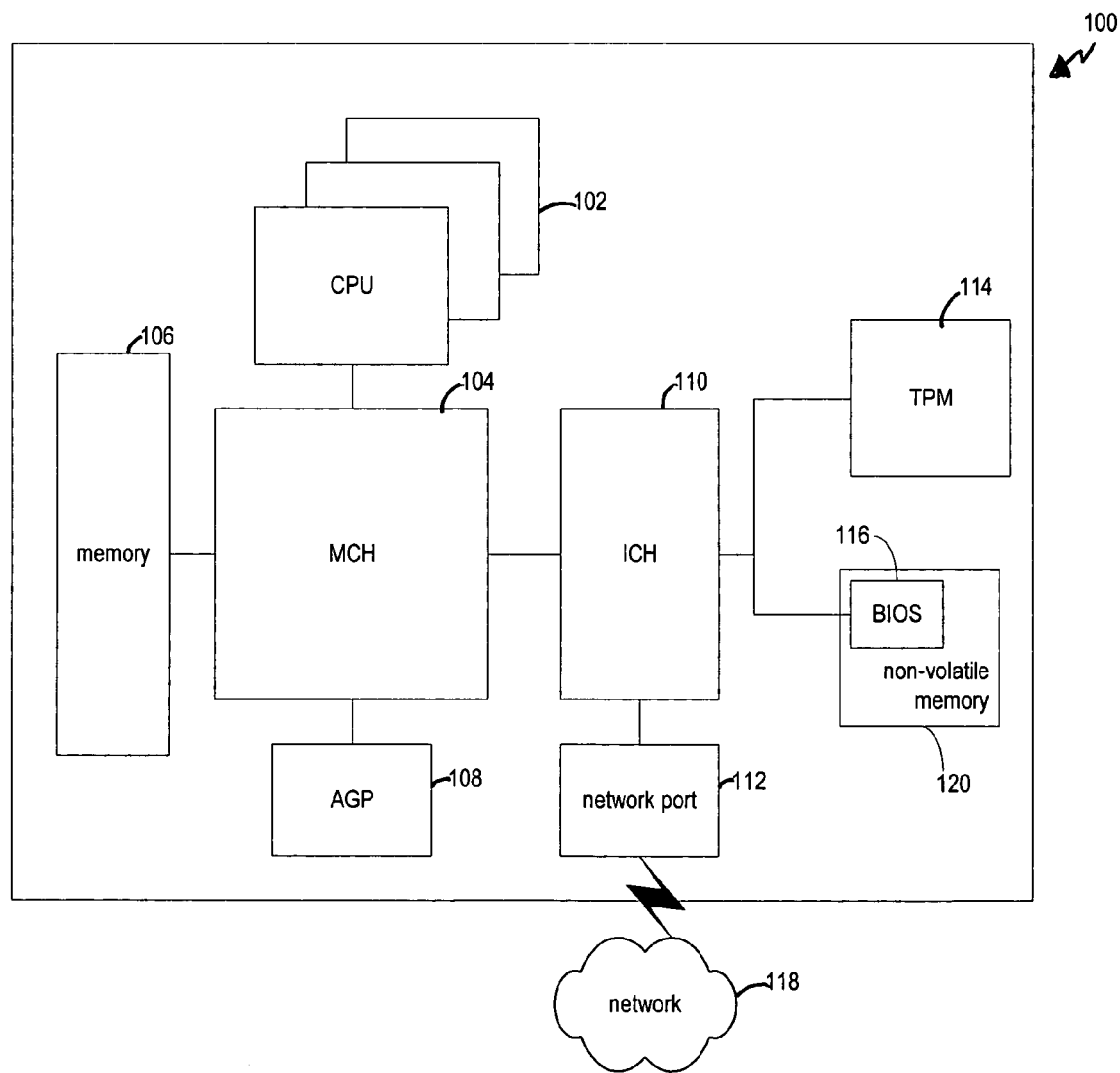
FIG. 1 depicts a block diagram of a target client computer according an exemplary embodiment of the present invention.

Exemplary embodiments of the present invention are now described with reference to the accompanying drawings. In the drawings, like reference numbers generally indicate identical, functionally similar, and/or structurally similar elements. The drawing in which an element first appears is generally indicated by the left-most digit(s) in the corresponding reference number.

DETAILED DESCRIPTION OF VARIOUS EMBODIMENTS

While the present invention is described in terms of the examples below, this is for convenience only and is not intended to limit its application. In fact, after reading the following description, it will be apparent to one of ordinary skill in the art how to implement the following invention in alternative embodiments.

In this detailed description, numerous specific details are set forth. However, it is understood that embodiments of the invention may be practiced without these specific details. In other instances, well-known circuits, structures, and/or techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In this detailed description and claims, the term "coupled," along with its derivatives, such as, "connected" and "electrically connected", may be used. It should be understood that "coupled" may mean that two or more elements are in direct physical or electrical contact with each other or that the two or more elements are not in direct contact but still cooperate or interact with each other.

According to some embodiments of the invention, an algorithm is considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

According to some embodiments of the invention, terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, in some embodiments, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-accessible medium, which may be read and executed by a computing platform to perform the operations described herein. A machine-accessible medium may include any mechanism for storing or transmitting information in a form readable by a machine (e.g., a computer). For example, a machine-accessible medium may include read only memory (ROM); random access memory (RAM); magnetic disk storage media; optical storage media; flash memory devices; and others.

In an exemplary embodiment, a method of the present invention may store an attestation identity key in a computer's firmware. The firmware may be, for example, an Extensible Firmware Interface (EFI)-based firmware, an IEEE 1275 Open Firmware, LinuxBios, or PC/AT BIOS. When a computer having an attestation identity key in its firmware is connected to a network for the first time, a provisioning server may use the attestation identity key to ascertain whether the computer may be trusted on the network. The attestation identity key may allow a provisioning server to inspect the client system prior to performing base-level provisioning. The provisioning server will only configure clients that are in "well-known" and consistent states. The attestation identity key provides a consistent, well-known state.

To implement this bare-metal configuration and attestation, the target client computer, for example, a consumer desktop or a rack-server in a data-center, may have a Trusted Platform Module (TPM). The TPM may be described by the specifications available from the Trusted Computing Group (TCG), an Oregon nonprofit corporation. In addition to having the TPM on the target client computer, the firmware of the target client computer may also have firmware that performs a hash-extend operation of any installed code and data into a respective platform configuration register (PCR). The hash-extend operation may be a one-way hash operation performed by the TPM using a TPM_EXTEND command.

FIG. 1 depicts a block diagram of a target client computer 100 according an exemplary embodiment of the present invention. The computer 100 may have one or more central processing units (CPU) 102, coupled to a memory controller hub (MCH) 104. The MCH 104 may be coupled to memory 106, an accelerated graphics port (AGP) 108, and an input/output (I/O) controller hub (ICH) 110. The ICH 110 may be coupled to a network port 112, a trusted platform module (TPM) 114 and a BIOS 116. The BIOS 116 may be part of other non-volatile memory 120. The network port 112 may be coupled to a network 118, such as a local area network, a wide area network, or the Internet.

Figure 2:
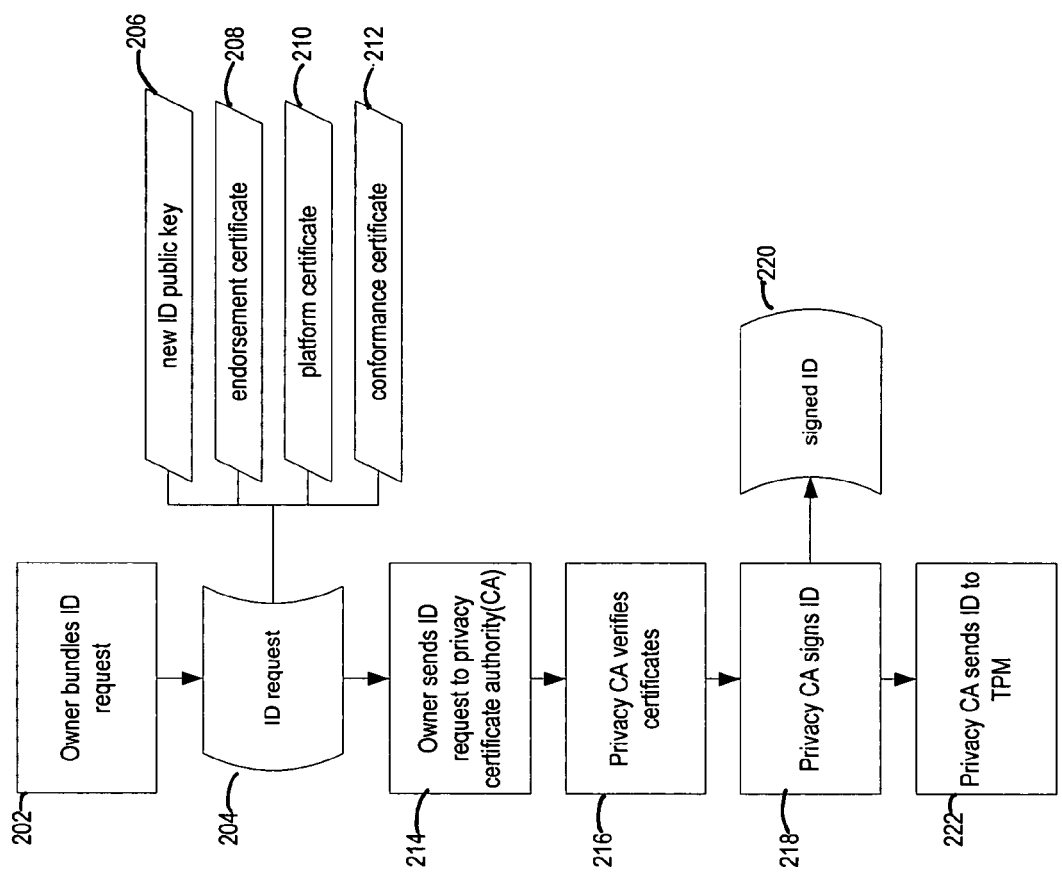
FIG. 2 depicts an exemplary embodiment of a method of enrollment of a target client computer.

FIG. 2 depicts an exemplary embodiment of a method of enrollment of a target client computer 100. In block 202, the owner may bundle an ID request 204 that may contain a new ID public key 206, an endorsement certificate 208, a platform certificate 210, and a conformance certificate 212. The new ID public key 206 may be the public portion of a private-public pair of keys created by the TPM that may become the attestation identity key (AIK). The AIK may be an asymmetric key, the private portion of which is non-migratable and protected by the TPM. The public portion of an AIK is part of the AIK credential, and may be issued using the privacy certificate authority (CA) protocol, the direct anonymous attestation (DAA) protocol, or any other appropriate protocol. The AIK may be used for platform authentication, platform attestation and certification of keys.

The endorsement certificate 208 may be a credential containing a public key portion of an endorsement key, which may be an RSA Key pair composed of a public key and a private key. The endorsement key may be used to recognize a genuine TPM. The endorsement key may be used to decrypt information sent to a TPM in privacy certificate authority and DAA protocols, and during the installation of an owner in the TPM. The endorsement certificate 208 may assert that the holder of the private portion of the endorsement key is a TPM conforming to TCG specifications. The platform certificate 210 may be a credential, for example, a digital certificate, attesting that a specific platform contains a unique genuine TPM. The conformance certificate 212 may be a credential that vouches for the conformance of the TPM to the TCG specifications.

The owner may then send the ID request 204 to a privacy certificate authority (CA) in block 214. The privacy CA may verify the certificates in the ID request 204 in block 216. When the certificates are verified, the privacy CA may sign the ID in block 218. Then the signed ID 220 is sent to the owner, for example, over a network or on a machine-accessible medium, such as a compact disk, that may be installed in the TPM 114 in block 222.

In an exemplary embodiment, the present invention may allow for secure provisioning with standard-based hardware. A remote machine may be provisioned, and attestation may be used to guarantee the identity of the client machine. Although pre-boot viruses and defects are opaque to conventional provisioning solutions, an exemplary embodiment of the present invention may allow the provisioning software to ascertain the integrity of the client machine configuration.

Figure 3:
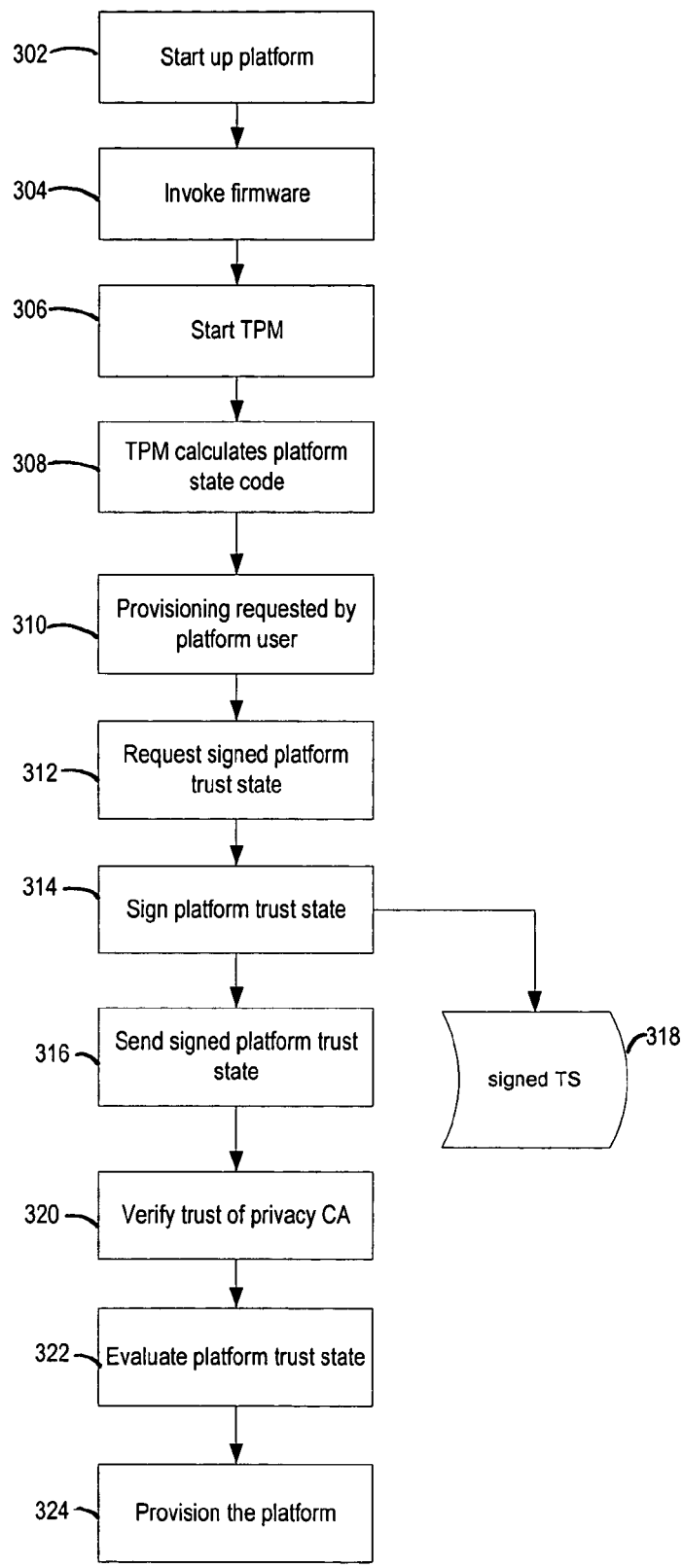
FIG. 3 depicts an exemplary embodiment of a method of attestation of a target client computer.

FIG. 3 depicts an exemplary method of remote provisioning and attestation according to an exemplary embodiment of the present invention. When the target client computer 100 is delivered to the customer, such as a deployment using the Microsoft advanced deployment services, the provisioning server may ascertain the machine state of the target client computer. Specifically, when a target client computer 100 is first connected to a network, the target client computer may be started up in block 302. The startup process may include invoking the firmware in block 304. The firmware may then start the trusted platform module (TPM) in block 306. The TPM may calculate a platform state value in block 308. The calculation may include a hash-extend operation over all of the code and data values in the platform configuration registers in the TPM. The TPM may also sign the trust state with the private portion of the AIK. When the target client computer 100 appears on the network, the target client computer 100 may request provisioning in block 310. Alternatively, the target client computer 100 may be challenged by a provisioning server or other service provider.

The provisioning server may then request a signed trust state from the target client computer 100 in block 312. The platform trust state 318 may then be signed with the private portion of the AIK in block 314 and may be sent to the provisioning server in block 316. The provisioning server may then check the trustworthiness of the privacy CA in block 320. Verifying the trust of the privacy CA may be performed by a human administrator based on a the administrator's social trust of the privacy CA. If, for example, the privacy CA that signed the AIK is known to the network administrator or corporation to be untrustworthy, then the target client computer 100 may be removed from the network. If the privacy CA is trustworthy, the provisioning server may evaluate the platform trust state in block 322. The platform trust state may be evaluated by comparing the AIK provided by the manufacturer (that is the enrolled platform trust state created during the enrollment as described, for example, in FIG. 2) to the signed trust state provided by the TPM. If the target client computer 100 has not been tampered with, then the values of the PCRs will be unchanged. The hash-extended code calculated over all of the PCRs by the TPM will therefore also be unchanged from enrollment. If the hash codes and the trust state match, then the target client computer 100 has not been tampered with. The TPM has demonstrated that it owns the private portion of the AIK and that the software in the firmware has not been tampered with. The platform is then configured in block 324.

According to the operating environments discussed below, the present invention, according to the embodiments described above, may be implemented in an apparatus designed to perform these operations.

Figure 4:
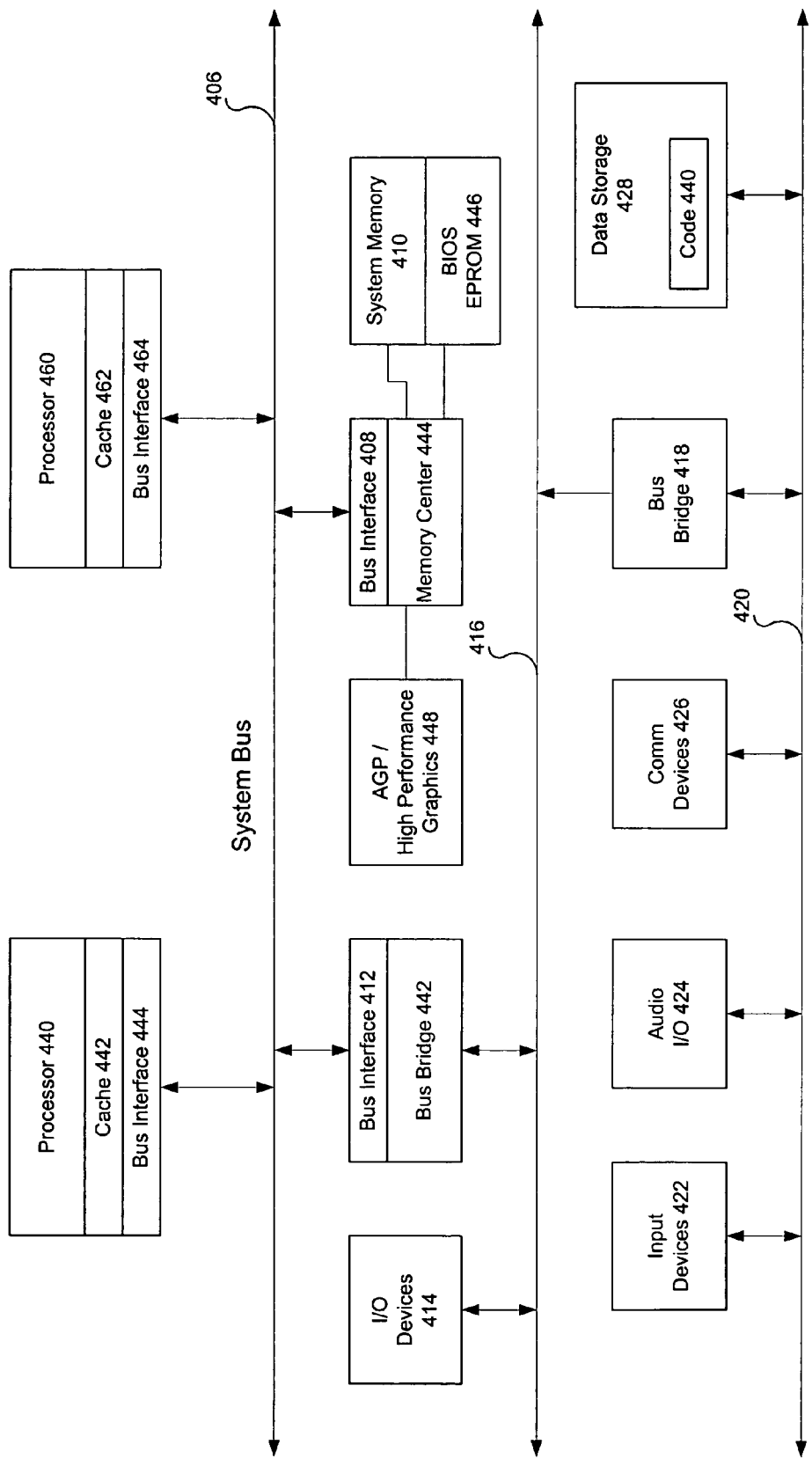
FIGS. 4-5 illustrate diagrams of system environments capable of being adapted to perform the operations of multiple assertion detection, according to embodiments of the present invention.
Figure 5:
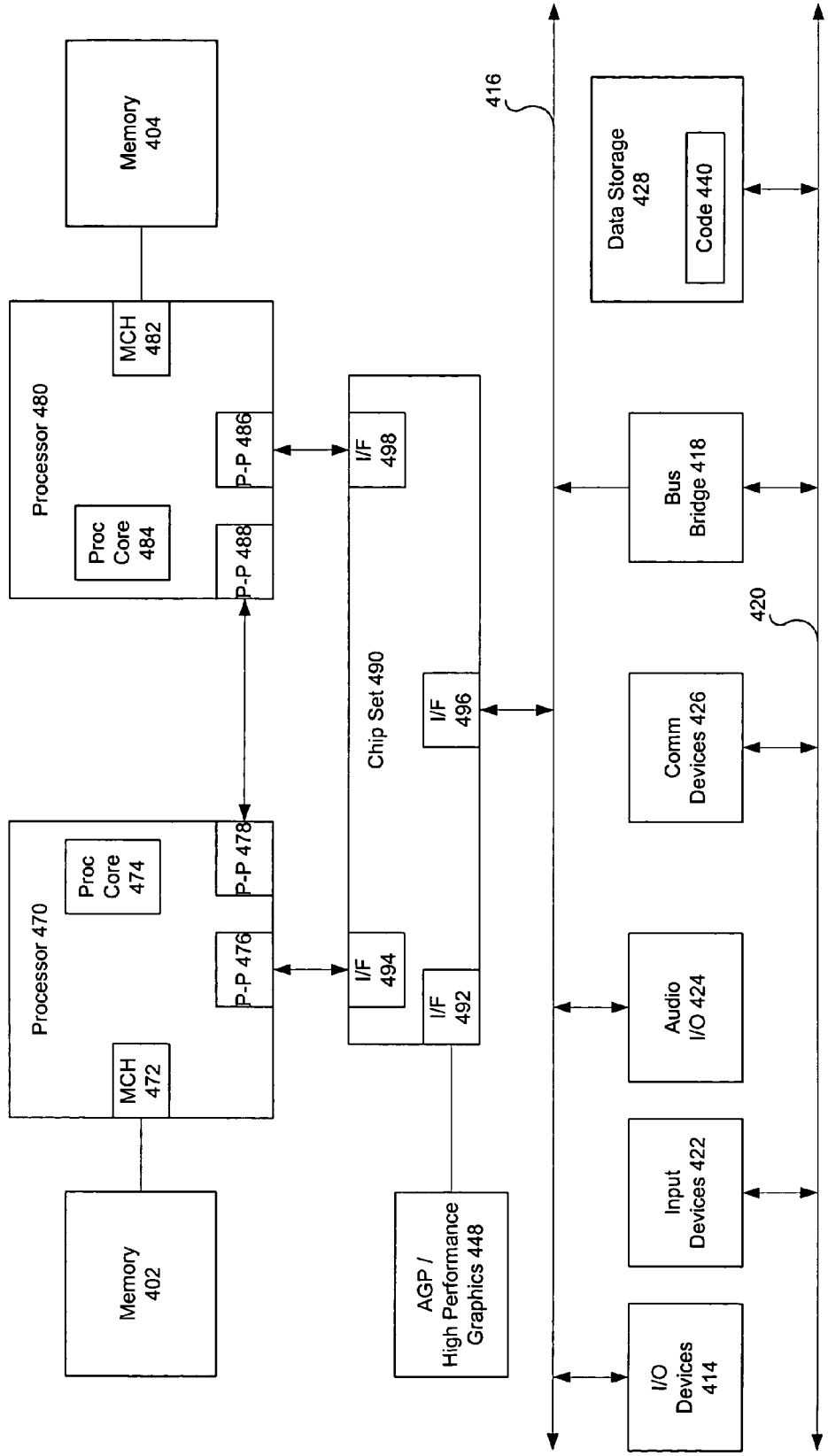

Specifically, and only by way of example, the present invention may be implemented using one or more microprocessor architectures or a combination thereof and may be implemented with one or more memory hierarchies. In fact, in one embodiment, the invention may be directed toward one or more processor environments capable of carrying out the functionality described herein. An example of system environments 400 and 500 are shown in FIGS. 4 and 5 and include one or more central processing units, memory units, and buses. The system environments 400 and 500 may include a core logic system chip set that connects a microprocessor to a computing system. Various microprocessor architecture embodiments are described in terms of these exemplary micro-processing and system environments. After reading this description, it will become apparent to a person of ordinary skill in the art how to implement the invention using other micro-processing and/or system environments, based at least on the teachings provided herein.

Referring now to FIGS. 4 and 5, schematic diagrams of systems including a processor are shown, according to two embodiments of the present invention. The system environment 400 generally shows a system where processors, memory, and input/output devices may be interconnected by a system bus, whereas the system environment 500 generally shows a system where processors, memory, and input/output devices may be interconnected by a number of point-to-point interfaces.

The system environment 400 may include several processors, of which only two, processors 440, 460 are shown for clarity. Processors 440, 460 may include level one (L1) caches 442, 462. The system environment 400 may have several functions connected via bus interfaces 444, 464, 412, 408 with a system bus 406. In one embodiment, system bus 506 may be the front side bus (FSB) utilized with Pentium® class microprocessors. In other embodiments, other busses may be used. In some embodiments memory controller 434 and bus bridge 432 may collectively be referred to as a chip set. In some embodiments, functions of a chipset may be divided among physical chips differently from the manner shown in the system environment 400.

Memory controller 434 may permit processors 440, 460 to read and write from system memory 410 and/or from a basic input/output system (BIOS) erasable programmable read-only memory (EPROM) 436. In some embodiments BIOS EPROM 436 may utilize flash memory. Memory controller 434 may include a bus interface 408 to permit memory read and write data to be carried to and from bus agents on system bus 406. Memory controller 434 may also connect with a high-performance graphics circuit 438 across a high-performance graphics interface 439. In certain embodiments the high-performance graphics interface 439 may be an advanced graphics port (AGP) interface. Memory controller 434 may direct read data from system memory 410 to the high-performance graphics circuit 438 across high-performance graphics interface 439.

The system environment 500 may also include several processors, of which only two, processors 470, 480 are shown for clarity. Processors 470, 480 may each include a local memory channel hub (MCH) 472, 482 to connect with memory 402, 404. Processors 470, 480 may exchange data via a point-to-point interface 450 using point-to-point interface circuits 478, 488. Processors 470, 480 may each exchange data with a chipset 490 via individual point-to-point interfaces 452, 454 using point to point interface circuits 476, 494, 486, 498. Chipset 490 may also exchange data with a high-performance graphics circuit 438 via a high-performance graphics interface 492.

In the system environment 400, bus bridge 432 may permit data exchanges between system bus 406 and bus 416, which may in some embodiments be a industry standard architecture (ISA) bus or a peripheral component interconnect (PCI) bus. In the system environment 500, chipset 490 may exchange data with a bus 416 via a bus interface 496.

In either system, there may be various input/output (I/O) devices 414 on the bus 416, including in some embodiments low performance graphics controllers, video controllers, and networking controllers. Another bus bridge 418 may in some embodiments be used to permit data exchanges between bus 416 and bus 420. Bus 420 may in some embodiments be a small computer system interface (SCSI) bus, integrated drive electronics (IDE) bus, or universal serial bus (USB) bus. Additional I/O devices may be connected with bus 420. These may include input devices 422, which may include, but are not limited to, keyboards, pointing devices, and mice, audio I/O 424, communications devices 426, including modems and network interfaces, and data storage devices 428. Software code 430 may be stored on data storage device 428. In some embodiments, data storage device 428 may be, for example, but is not limited to, a fixed magnetic disk, a floppy disk drive, an optical disk drive, a magneto-optical disk drive, a magnetic tape, electrically erasable programmable read-only memory (EEPROM), or non-volatile memory including flash memory.

Figure 6:
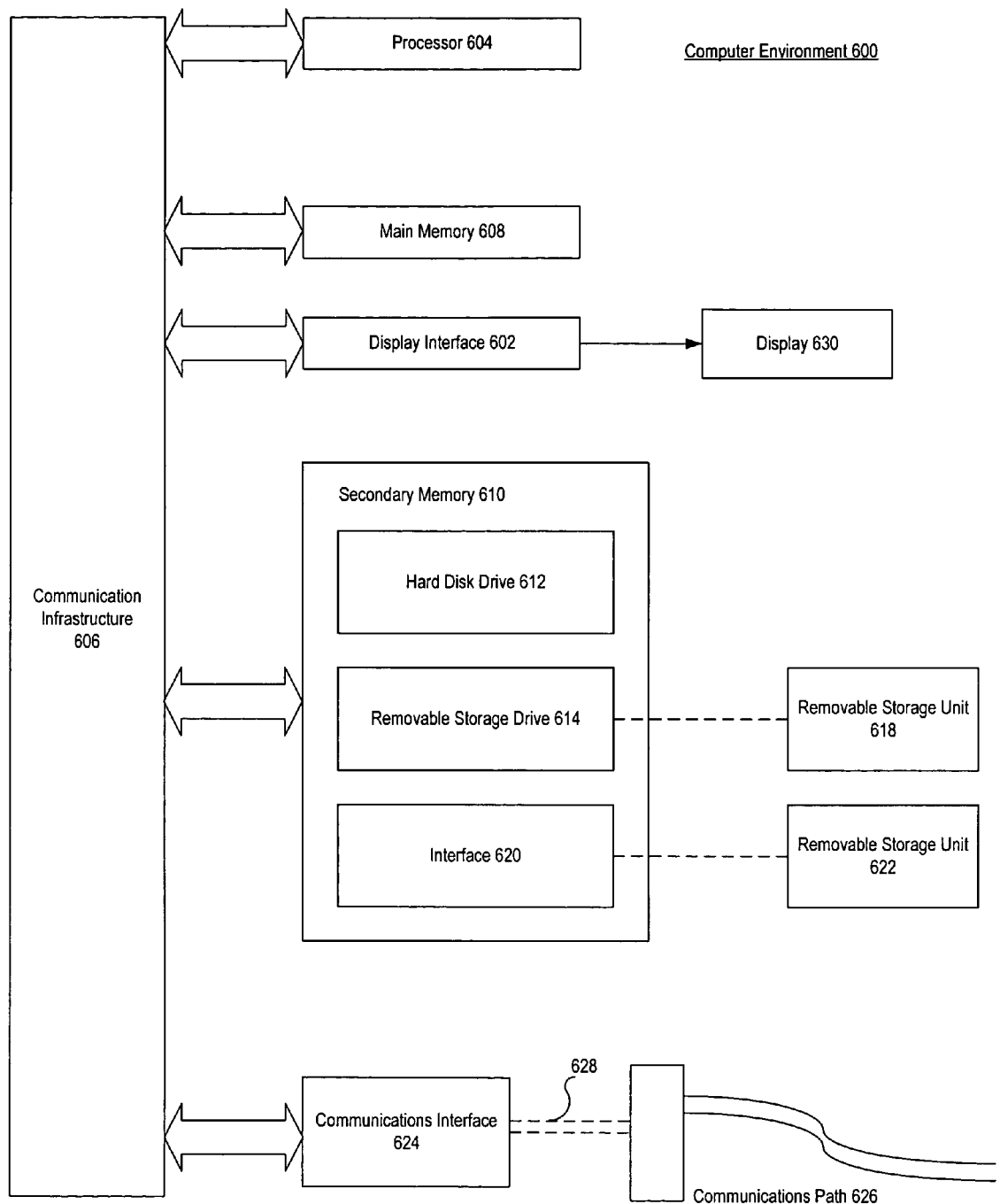
FIG. 6 illustrates a diagram of a computing environment capable of being adapted to perform the operations of attestation and provisioning, according to an embodiment of the present invention.

Embodiments of the present invention (i.e., the components of FIGS. 1-3 or any part thereof) may be implemented using hardware, software or a combination thereof and may be implemented in one or more computer systems or other processing systems. In fact, in one embodiment, the invention may comprise one or more computer systems capable of carrying out the functionality described herein. An example of a computer system 600 is shown in FIG. 6. The computer system 600 may include one or more processors, such as processor 604. The processor 604 may be connected to a communication infrastructure 606 (e.g., a communications bus, cross over bar, or network). Various software embodiments are described in terms of this exemplary computer system. After reading this description, it will become apparent to a person skilled in the relevant art(s) how to implement the invention using other computer systems and/or computer architectures.

Computer system 600 may include a display interface 602 that may forward graphics, text, and other data from the communication infrastructure 606 (or from a frame buffer not shown) for display on the display unit 630.

Computer system 600 may also include a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc, but which is not limited thereto. The removable storage drive 614 may read from and/or write to a removable storage unit 618 in a well known manner. Removable storage unit 618, may represent a floppy disk, magnetic tape, optical disk, etc. which may be read by and written to by removable storage drive 614. As will be appreciated, the removable storage unit 618 may include a computer usable storage medium having stored therein computer software and/or data.

In alternative embodiments, secondary memory 610 may include other similar means for allowing computer programs or other instructions to be loaded into computer system 600. Such means may include, for example, a removable storage unit 622 and an interface 620. Examples of such may include, but are not limited to, a program cartridge and cartridge interface (such as that found in video game devices), a removable memory chip (such as an EPROM, or PROM) and associated socket, and/or other removable storage units 622 and interfaces 620 that may allow software and data to be transferred from the removable storage unit 622 to computer system 600.

Computer system 600 may also include a communications interface 624. Communications interface 624 may allow software and data to be transferred between computer system 600 and external devices. Examples of communications interface 624 may include, but are not limited to, a modem, a network interface (such as an Ethernet card), a communications port, a PCMCIA slot and card, etc. Software and data transferred via communications interface 624 are in the form of signals 628 which may be, for example, electronic, electromagnetic, optical or other signals capable of being received by communications interface 624. These signals 628 may be provided to communications interface 624 via a communications path (i.e., channel) 626. This channel 626 may carry signals 628 and may be implemented using wire or cable, fiber optics, a phone line, a cellular phone link, an RF link and/or other communications channels.

The terms "computer program medium" and "computer usable medium" are used here to refer generally to media such as, but not limited to, removable storage drive 614, and a hard disk installed in hard disk drive 612. These computer program media are means for providing software to computer system 600.

Computer programs (also called computer control logic) may be stored in main memory 608 and/or secondary memory 610. Computer programs may also be received via communications interface 624. Such computer programs, when executed, enable the computer system 600 to perform the features of the present invention as discussed herein. In particular, the computer programs, when executed, may enable the processor 604 to perform the present invention in accordance with the above-described embodiments. Accordingly, such computer programs represent controllers of the computer system 600.

In an embodiment where the invention is implemented using software, the software may be stored in a computer program product and loaded into computer system 600 using, for example, removable storage drive 614, hard drive 612 or communications interface 624. The control logic (software), when executed by the processor 604, causes the processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). As discussed above, the invention is implemented using any combination of hardware, firmware and software.

While various embodiments of the invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus the invention should not be limited by any of the above described exemplary embodiments, but should be defined only in accordance with the following claims and their equivalents.

What is claimed is:

1. A method of attestation comprising:
   connecting a computer having no operating system installed thereon, and having firmware and a trusted platform module (TPM) coupled to said firmware to a network;
   determining a current platform trust state for said computer, wherein said current platform trust state is based on a current state of said firmware;
   receiving a challenge from a challenger on said network, wherein said challenger holds an enrolled platform trust state for said computer;
   signing said current platform trust state with a private portion of an attestation identity key (AIK);
   providing said signed current platform trust state to said challenger; and
   accessing said network when said signed current platform trust state matches said enrolled platform trust state.

2. The method of claim 1, wherein said TPM comprises a plurality of platform configure registers (PCR) and determining a current platform trust state comprises: performing a hash-extend operation on contents of said PCRs.

3. The method of claim 1, further comprising:
   provisioning said computer across said network.

4. The method of claim 1, further comprising, prior to connecting said computer to said network:
   bundling an identification (ID) request for said computer;
   sending said ID request to a privacy certificate authority;
   receiving a verified and signed ID from said privacy certificate authority; and
   installing said verified and signed ID on said firmware.

5. The method of claim 4, wherein said verified and signed ID is installed in at least one of extensible firmware interface (EFI)-based firmware, IEEE 1275 open firmware, LinuxBios, or a PC/AT BIOS.

6. The method of claim 4, wherein bundling an ID request comprises bundling at least one of a new public ID key, an endorsement certificate, a platform certificate, or a conformance certificate into said ID request.

7. The method of claim 6, wherein said new public ID key is a public portion of an attestation identity key (AIK), said AIK having a public portion and a private portion, wherein said private portion is maintained by said TPM.

8. A method of provisioning, comprising:
   detecting a new computer having no operating system installed thereon on a network;
   challenging said new computer;
   receiving a current platform trust state, signed with a private portion of an attestation identity key (AIK), from said new computer; comparing said signed current platform trust state with an enrolled platform trust state, wherein said enrolled platform trust state is signed by a privacy certificate authority; and
   allowing said new computer to access said network when said enrolled platform trust state and said signed current platform trust state match.

9. The method of claim 8, further comprising:
   verifying trust in said privacy certificate authority; and
   allowing said new computer to access said network when said privacy certificate authority is trustworthy.

10. An apparatus, comprising:
    a processor;
    firmware, coupled to said processor;
    a trusted platform module (TPM), coupled to said firmware;

a plurality of platform configuration registers (PCR) coupled to said TPM, wherein said PCRs contain a first platform state signed by a privacy certificate authority; and an attestation identity key (AIK), maintained by said TPM, wherein said AIK comprises a public and private key;

wherein the apparatus has no operating system installed thereon;

wherein said TPM is operative to calculate a platform state signed with said private portion of said AIK according to a platform state contained in said PCRs, and is operative to provide said calculated platform state to a challenging network; and wherein a comparison of said first platform state and said calculated platform state being identical indicates that the apparatus has not been tampered with.

11. The apparatus of claim 10, wherein said firmware is at least one of extensible firmware interface (EFI)-based firmware, IEEE 1275 open firmware, LinuxBios, or a PC/AT BIOS.

12. The apparatus of claim 10, wherein said firmware is operative to provide said public key of said AIK and said platform trust state without an operating system running on said processor.

13. A machine-accessible medium containing software code that, when read by a computer, causes the computer to perform a method comprising:

detecting a new computer on a network, said computer having no operating system installed thereon, and having firmware and a trusted platform module (TPM);

challenging said new computer;

receiving a current platform trust state signed with a private portion of an attestation identity key (AIK) from said new computer;

comparing said signed current platform trust state with an enrolled platform trust state, wherein said enrolled platform trust state is signed by a privacy certificate authority; and allowing said new computer to access said network when said enrolled platform trust state and said signed current platform trust state match.

14. The machine-accessible medium of claim 13, wherein the software code causes the computer to perform the method further comprising:

verifying trust in said privacy certificate authority;

preventing said new computer from accessing said network when said privacy certificate authority is not trustworthy; and allowing said new computer to access said network when said privacy certificate authority is trustworthy.

15. The machine-accessible medium of claim 13, wherein said enrolled platform trust state is installed in at least one of extensible firmware interface (EFI)-based firmware, IEEE 1275 open firmware, LinuxBios, or a PC/AT BIOS on said new computer.

16. A machine-accessible medium containing software code that, when read by a computer, causes the computer to perform a method comprising:

determining a current platform trust state for a computer having no operating system installed thereon, and having firmware and a trusted platform module (TPM) coupled to said firmware, wherein said current platform trust state is based on a current state of said firmware and said computer is coupled to a network;

receiving a challenge from a challenger on said network, wherein said challenger holds an enrolled platform trust state for said computer;

signing said current platform trust state with a private portion of an attestation identity key (AIK);

providing said signed current platform trust state to said challenger; and accessing said network when said signed current platform trust state matches said enrolled platform trust state.

17. The machine-accessible medium of claim 16, wherein said TPM comprises a plurality of platform configure registers (PCR) and determining a current platform trust state comprises:

performing a hash-extend operation on contents of said PCRs.

* * * * *